(12) United States Patent
Dock

(10) Patent No.: US 11,614,229 B2
(45) Date of Patent: Mar. 28, 2023

(54) WATER VAPOR INSULATION SYSTEM

(71) Applicant: Jason Earl Dock, Renton, WA (US)

(72) Inventor: Jason Earl Dock, Renton, WA (US)

(*) Notice: Subject to any disclaimer, the term of this patent is extended or adjusted under 35 U.S.C. 154(b) by 294 days.

(21) Appl. No.: 16/820,210

(22) Filed: Mar. 16, 2020

(65) Prior Publication Data

US 2020/0292165 A1    Sep. 17, 2020

Related U.S. Application Data

(60) Provisional application No. 62/818,590, filed on Mar. 14, 2019.

(51) Int. Cl.
| | | |
|---|---|---|
| *F22D 11/04* | (2006.01) | |
| *F22B 1/00* | (2006.01) | |
| *F22B 35/10* | (2006.01) | |
| *F22B 37/72* | (2006.01) | |
| *F22B 3/02* | (2006.01) | |

(52) U.S. Cl.
CPC ............. *F22D 11/04* (2013.01); *F22B 1/006* (2013.01); *F22B 35/10* (2013.01); *F22B 37/72* (2013.01); *F22B 3/02* (2013.01)

(58) Field of Classification Search
CPC ..................................................... F22D 11/04
See application file for complete search history.

(56) References Cited

U.S. PATENT DOCUMENTS

| | | | | |
|---|---|---|---|---|
| 3,920,953 A | * | 11/1975 | Laing .................... | F28D 20/023 165/96 |
| 4,160,523 A | * | 7/1979 | Stevens .................... | F24S 10/72 126/400 |
| 5,014,841 A | * | 5/1991 | Gillespie .................. | F16D 43/12 192/103 A |
| 6,000,170 A | * | 12/1999 | Davis ..................... | A01G 9/243 52/173.3 |

(Continued)

FOREIGN PATENT DOCUMENTS

| | | |
|---|---|---|
| JP | 5997855 B1 * 9/2016 | |
| WO | WO-03014486 A2 * 2/2003 | ........... A01G 9/1415 |

OTHER PUBLICATIONS

WO03014486A2—machine translation (Year: 2003).*
JP5997855B1—machine translation (Year: 2016).*

*Primary Examiner* — Nathaniel Herzfeld
(74) *Attorney, Agent, or Firm* — Davis Wright Tremaine LLP

(57) ABSTRACT

Systems and techniques are described herein for an insulation system that utilizes a treated gas, such as water vapor, to fill an at least partially transparent cavity that is part of a structure, to provide insulating properties and/or changes in exposure to the sun for a space, proximate to the structure. In some aspects, an insulation system may include a treated gas generation system, which includes at least one of a heating element, a cooling element, or a diffusing element for treating the gas. The system may also include a gas movement system in communication with the gas generation (Continued)

system. The system may further include a gas conduit system in communication with the gas movement system, where the gas movement system causes the treated to be injected into the gas conduit system to change insulation and/or sun exposure characteristics of a space in proximity to the gas conduit system.

17 Claims, 12 Drawing Sheets

(56) References Cited

U.S. PATENT DOCUMENTS

| | | | | |
|---|---|---|---|---|
| 6,442,903 B1 * | 9/2002 | Hebert | .................... | A01G 9/225 47/29.1 |
| 7,788,876 B2 * | 9/2010 | Yasui | ..................... | A01G 9/225 52/222 |
| 8,336,822 B2 * | 12/2012 | MacGregor | ............. | B64C 1/066 244/119 |
| 8,875,526 B1 * | 11/2014 | Isaacson | ............... | F24F 5/0021 62/272 |
| 9,481,996 B2 * | 11/2016 | Duforestel | ................ | E04B 1/74 |

* cited by examiner

WATER VAPOR INSULATION SYSTEM

CROSS-REFERENCE TO RELATED APPLICATIONS

The present application for patent claims priority through the applicant's prior provisional patent application, entitled: WATER VAPOR INSULATION SYSTEM, Ser. No. 62/818,590, filed Mar. 14, 2019; which provisional application is hereby incorporated by reference in its entirety.

BACKGROUND

Greenhouses are used worldwide to enhance valuable crop production. Creating and managing a greenhouse controlled environment requires a multitude of systems to operate collaboratively. For example, typical greenhouse environments utilize heating, cooling, shading, irrigation, lighting, HVAC, pest management, and various other systems. Greenhouses lose much of their inside heat from areas that have low insulation values. Greenhouses are typically built with transparent materials to allow sunlight in for plant photosynthesis. The problem with most transparent materials is that they have very low insulation values, causing most greenhouses to have a relatively low insulation value. In most cases heating greenhouses during cold temperatures require a lot of energy and some very complex heating systems. Because of typically low insulation values, cooling greenhouses or similarly enclosed spaces during times of hotter temperatures can also be complex and inefficient.

BRIEF DESCRIPTION OF THE DRAWINGS

Various techniques will be described with reference to the drawings, in which.

DETAILED DESCRIPTION

Figure 1:
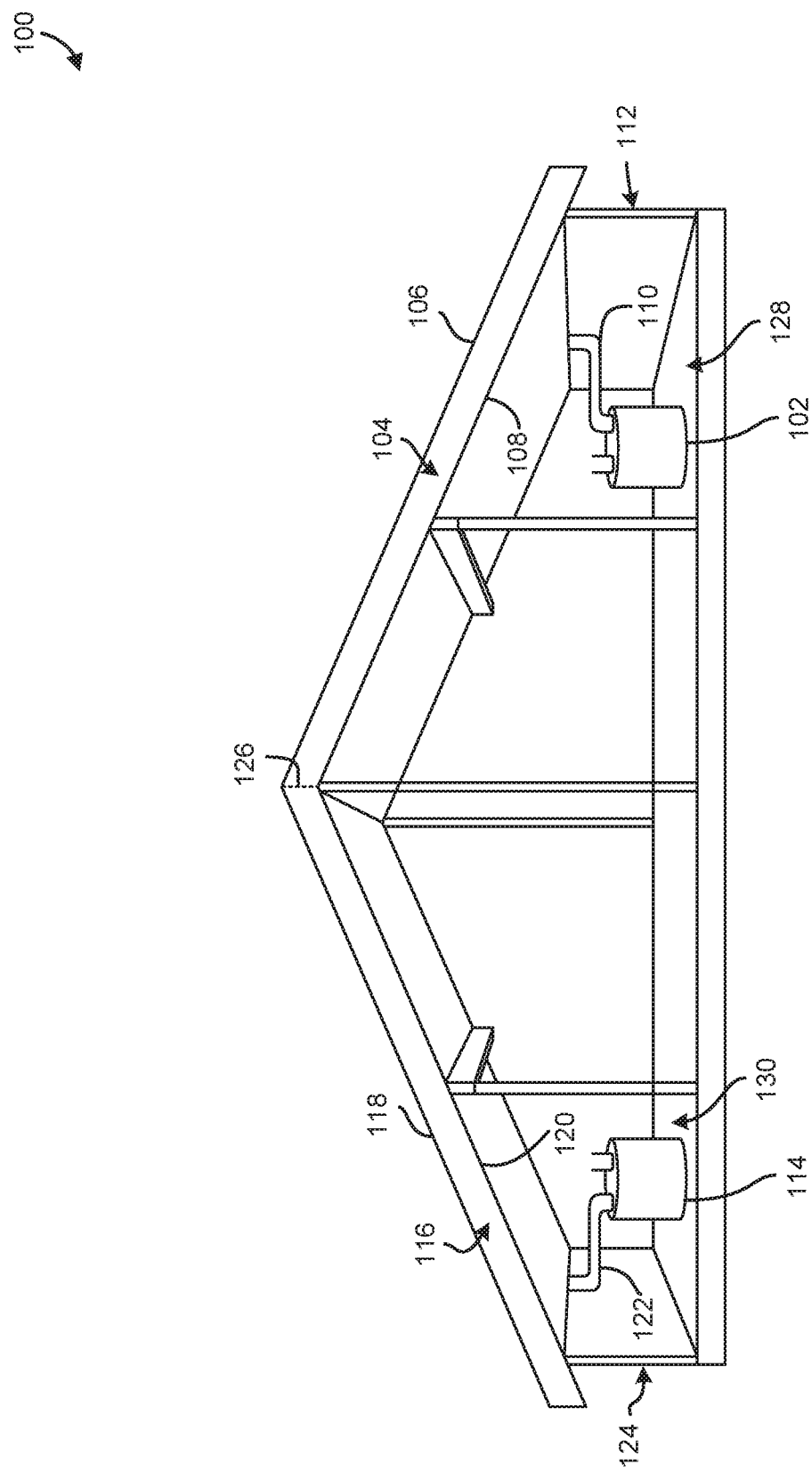
FIG. 1 illustrates an example of a greenhouse insulation system, in accordance with at least one embodiment.

The present document describes techniques and systems for providing an insulation system that utilizes two at least partially transparent layers to create a cavity in which water vapor and/or other gases may be introduced and removed, to better control temperature and sun exposure of a space below or at least partially enclosed by the insulation system. The described systems and techniques are primarily directed to greenhouse applications, in which the system is installed as a roof or at least partially covering a space for growing and cultivating bio material. In some cases, the described system may be: more effective, more efficient, require lower maintenance, and/or be more cost effective way to cool, heat, and shade greenhouses or other enclosed or partially enclosed structures.

In some aspects, the described system may lower the demand and cost of greenhouse heating, cooling, and sun exposure control systems. For heating and cooling, the described techniques utilize an on demand layer of temperature controlled gas, such as water vapor, that may include one or more agents introduced into the gas. This layer of temperature controlled gas or water vapor may be effective at insulating a structure from the suns high heat and from cold temperatures. Greenhouse roofs are very susceptible to allowing cold in and heat out, especially at night when temperatures drop, which can inhibit optimal growing environments for many plants. In some examples, the described system creates a layer or blanket of water vapor (or other gas) inside of an at least partially transparent roof to structure keeping heat in and cold out. As described herein, the operating cost to produce this water vapor layer may be vastly lower than conventional heating systems.

For cooling of greenhouses, the described system utilizes two methods. First, the system uses a blanket of cold fog, water vapor, or other gas. This blanket of cold fog is distributed between two transparent layers, which comprise a roof or covering structure, walls, and/or other structural components of a structure used to control temperature. This cold layer of water vapor may protect and insulates the greenhouses environment from outside high temperatures. In some cases, in addition or in the alternative to using the desi beds system as a roof or covering layer for a growing space, the described gas cavity may be formed around, underneath, and/or through a growing space, such as in a conventional building or greenhouse.

The described systems and techniques may also provide for a more effective and efficient way to provide shade or a sun barrier to a space either below or proximate to the described insulation system. In many greenhouses, shade systems are used for the purpose of cooling down temperatures and also for the use of blocking sun rays that damage various plants. These systems are vital to keeping some plants alive. Current shade systems can include washable shade paint that is sprayed on the outside of the greenhouse, shade cloth that is attached to the exterior of the roof or hung from the inside of the structure, and shade cloth systems that can be used for both shade and heat retention, including automated shade cloths that can be opened and closed or moved using mechanical devices. These conventional shade systems are typically expensive, high maintenance, and typically must be replaced often. For example, the disadvantages to spraying a greenhouse or similar structure with shade paint is that it is labor intensive. In addition to applying the paint, it must be removed. In order to completely remove these types of paint, workers must manually brush and wash the paint off. The removal process is abrasive and often degrades the integrity of roof material. Some disadvantages of using shade cloth include the fact that it is also labor intensive and while installing and removing the shade cloth, the greenhouse is often degraded because of abrasion. Some disadvantages of a mechanical shade system include cost and maintenance/replacement of moving parts to keep the system operating properly. These systems can require a great deal of maintenance, such that various parts often need to be replaced.

Although these systems provide benefits in some cases and are effective, these systems come at great cost. In addition to keeping heat from coming in through the roof or other structural component of a greenhouse/growing space, the described system may provide cooling and shade by blocking exposure to the sun. In some aspects, the water vapor creates up to close to 100% humidity within the roof, reflecting infrared sun rays which cause high greenhouse temperatures and harm to some plants. The described systems and techniques work as an active insulation cooling layer as well as a shade system to effectively cool and shade greenhouses.

While described primarily in the context of greenhouses of similar purposed structures, in some aspects, the described systems and techniques may be utilized in the building of any structure where heating, cooling, and/or shading is desired and/or where an at least partially transparent enclosure is appropriate.

In some examples, an ultrasonic diffuser is employed to produce water vapor. In some aspects, a heat element or heating process may additionally or alternatively be used to generate water vapor or other gas for injecting in to the described system. A double layer at least partially transparent system may be communicatively coupled to the diffuser or other water vapor generation system, to transport and position the water vapor proximate to a growing or other space desired to be insulated or shaded from sun exposure. The double layer system may form a housing or conduit for the water vapor to travel within and provide insulation and/or shading properties. In some aspects, the double layer system may at least partially wrap around or enclose a structure to provide a layer of water vapor or other gas, therefore providing a translucent insulator. The system may further utilize an air movement system to rapidly deploy and remove water vapor in and out of conduit system, providing a versatile system.

In some examples, an insulation system may include a double layer structure that is at least partially transparent or translucent, to let light through the double layer structure. Each of the layers may be made from glass, polycarbonate, or other similar material, in which the material itself is hydrophobic, or includes a hydrophobic coating, constructed in a way that allows a gas, to rapidly fill and empty the void cavities in between the two layers. Water vapor or fog produced from an ultrasonic diffuser may be deployed within the open cavity between the double layer structure for the purpose of cooling, heating and or protection/shading inside of or below the structure. In some cases, the system may also include a combined vacuum and blower assembly, such that the system can rapidly transition from a high concentration to a low concentration of gas (e.g., high to low humidity) in the camber formed by the double layer system. The described systems and techniques may rapidly clear or evacuate the gas and remove moisture from within the open cavity of the double layer structure and change the insulating properties of the structure, on demand.

In some cases, a temperature control system may be introduced to control the temperature of the gas (e.g., water vapor) introduced into the double layer or other gas transportation system. In some aspects, a heating element may provide both the functionality of generating water vapor and controlling the temperature of the water vapor. In other cases, the gas introduction or production system may be separate from or operate independently of the temperature control system.

In some cases, the water vapor may be generated by other processes, such as atomizing or nebulizing water using various known processes, or by heating water to produce steam. In some aspects, water with added inhibitors, such as Hydrogen peroxide, hydrophobic compounds, and or growth inhibitors may additionally or alternatively be used to provide other benefits. These benefits may include reducing degradation of the double layer conduit structure by employing growth inhibitors in the gas, reducing mold or other unwanted substances from entering and increasing in the conduit structure, and so on.

In some aspects, other non-transparent gasses may be used in place of water vapor or fog to enable changing the insulation characteristics and/or sun blocking characteristics of the described system. In some aspects, the non-transparent gas may include noble gasses that are inert and nontoxic, such as argon, neon, krypton, neon, and xenon, or other gasses, such as carbon dioxide. In some aspects, multiple gases may be sued in the same system, either as a mixture of different gases to yield certain insulating and/or UV resilience, or may be sued at different times to provide different insulating and sun protection characteristics due to changing conditions, time of day, season, etc.

In some cases, the described techniques may address one or more of the following challenges faced by current greenhouse systems. First, transparent materials used in current greenhouses typically have low insulation values and provide low temperature retention. Second, many greenhouse crops require expensive and high maintenance shade systems for crop health and heat retention. Third, there are generally high demands for greenhouse heating and cooling systems. The described systems and techniques address one or more of these problems by providing an at least partially transparent insulating system that provides a high insulating value, and lowers the strain and demand of existing greenhouse heating and cooling systems by providing an effective and new way to maintain a controlled environment with low energy cost.

FIG. 1 illustrates an example of a greenhouse insulation system 100. System 100 may include one or more gas or water vapor systems 128, 130 that inject and remove water vapor from an at least partially transparent cavity or space 104, 116, illustrated as a roof or cap of a structure, defined by at least two layers 106, 118, and 108, 120. In some aspects, system 100 may include one water vapor systems 128, 130, which include a gas or water vapor supply 102, 114, that provide the gas, via a channel, tube, pipe, etc. 110, 122, treated as described below, to one or more cavities or conduits 104, 116 such that the cavity forms channel in which air vapor or other gas can be injected and then removed via forcing air or other gas containing less or no water or other substance (e.g., purging or evacuating the treated gas with another gas). In other cases, the system 100 may include a single water vapor systems, such that the cavity 104, 116 is directional, whereby water vapor may be injected into the cavity and removed from the cavity in one or multiple directions. In some aspects, one or more of the water vapor systems may include one or more aspects of the water vapor generation system 400, water vapor extraction system 500, or water vapor movement system 600, described below in reference to FIGS. 4-6, and/or the cavity or conduit described in reference to FIGS. 7-11.

In some aspects, a single continuous cavity or conduit, defining spaces 104, 116, may be formed by two layers of material. The material may include a rigid structure made of glass or plastic panels or sheets, or may include malleable or pliable materials, such as flexible plastic or polycarbonate sheets, such that form a flexible or semi rigid structure. It should be appreciated that any transparent, partially transparent, or translucent material or combination of materials may be used to similar effect. In some aspects, the cavity or conduit that is designed to contain the water vapor or gas may be formed as part of a covering or roof type panel of a building or structure. In some cases, the conduit may encompass most or all of an exterior facing surface of the panel or side of the structure. In other cases, the conduit may only encompass a portion of a panel or side of a structure (e.g., one or part of one or more cavities 104, 116 separated by optional barrier 126). In some cases, the conduit may be formed in the roof (one or more panels, which can be planar or non-planar), in walls 112, 124, doors, or other components or portions thereof of a growing structure or building. In some cases, multiple different conduits 104, 116 may be formed on the roof or other wall of panel of a structure, to provide for more flexibility in what gas or content of water vapor is injected into each respective cavity 104, 116. In this example, different levels of insulation and/or sun protection may be provided to different aspects or surfaces 106, 118 that face different directions, to optimize insulation and sun protection, due to weather (e.g., clouds), movement of the sun throughout the day, and for various other reasons.

Figure 2:
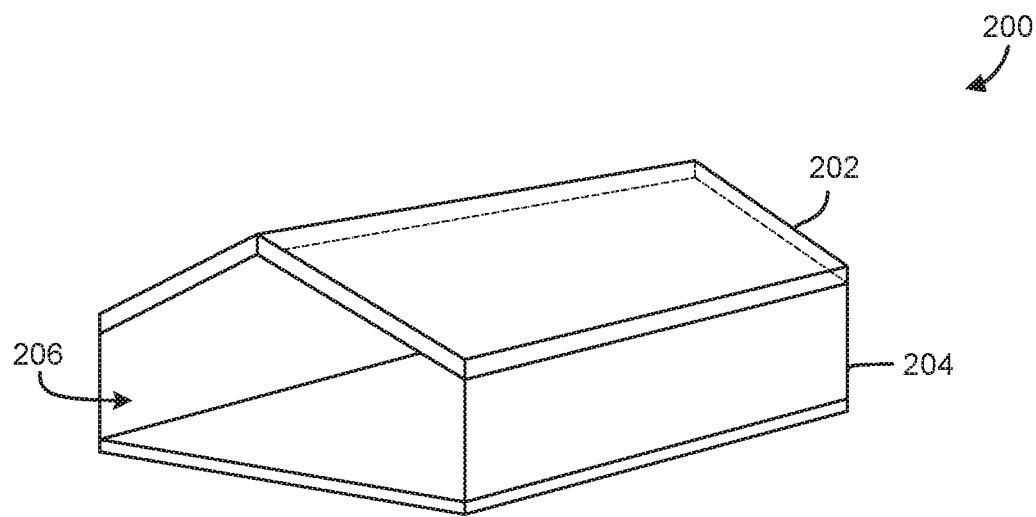
FIGS. 2 and 3 show illustrative examples of structures in which the described greenhouse insulation system may be utilized, in accordance with at least one embodiment.
Figure 3:
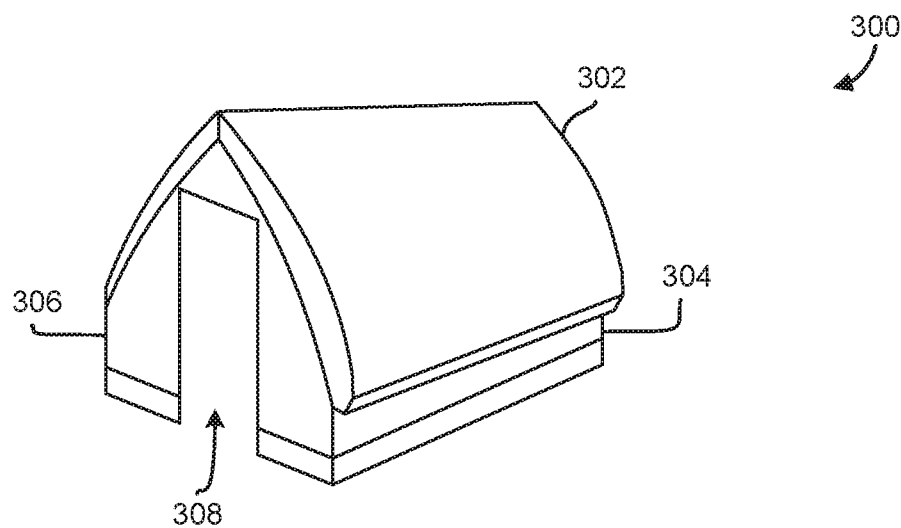

FIGS. 2-3 show illustrative examples of structures in which the described insulation system may be utilized. FIG. 2 illustrates a structure 200 having a planar roof 202, walls 204 and an opening 206, whereas FIG. 3 illustrates a structure 300 having a curved or non-planar roof 302, with shorter walls 304, a partially enclosed wall 306 and a door or opening 308. It should be appreciated that the described insulation system may be employed in a variety of different structures, such as structures 200 and/or 300, or various other structures not described herein, varying in any of multiple different ways that the structures depicted. The cavity in which water vapor or other gases are injected and removed may include a rigid structure made of glass or plastic panels or sheets, or may include malleable or pliable materials, such as flexible plastic or polycarbonate sheets, such that form a flexible or semi rigid structure. In some cases, the described insulation system may be employed in residential building, office or commercial buildings, and really any structure in which insulation and/or sun protection is desired.

Figure 4:
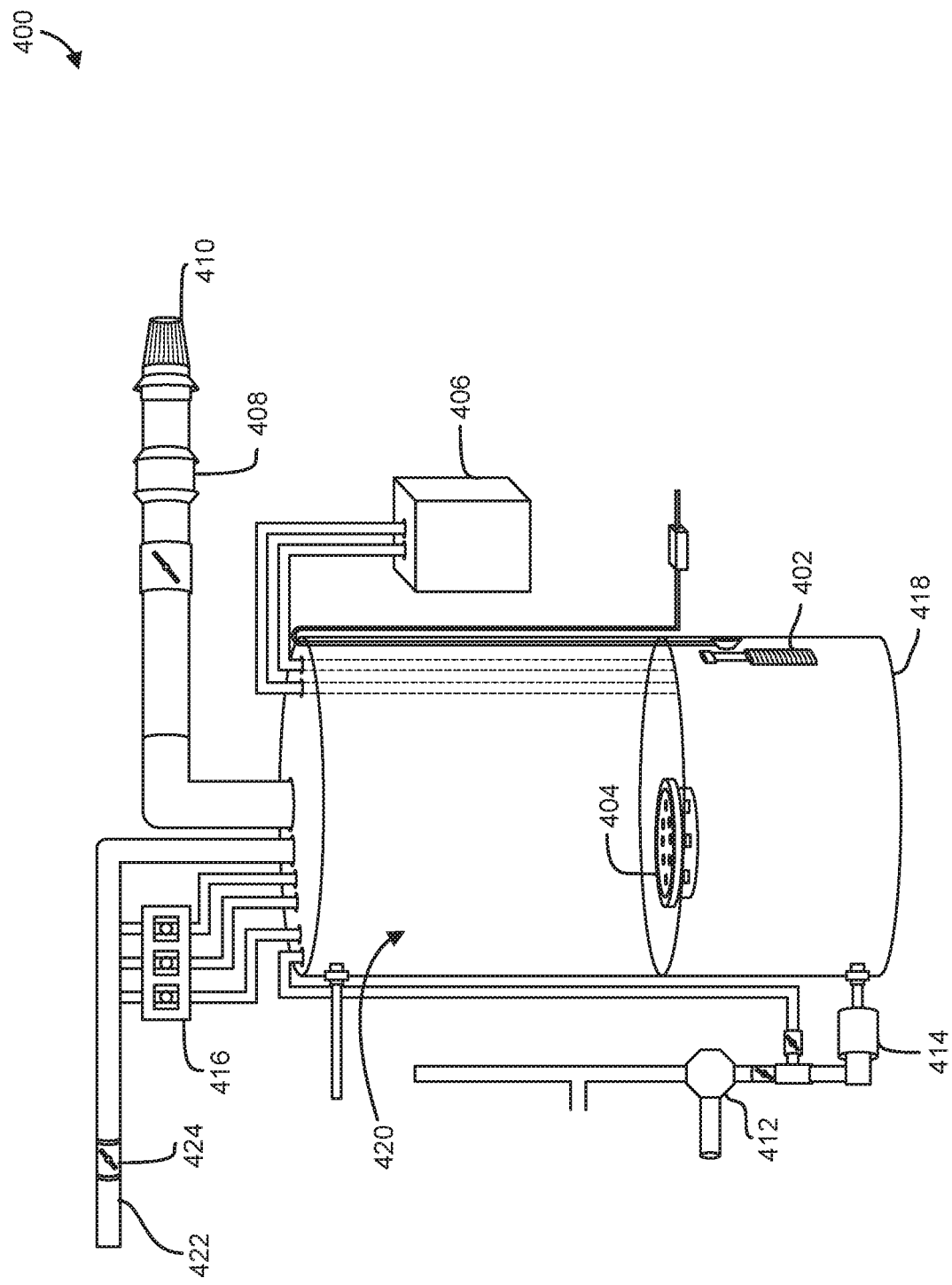
FIG. 4 shows an illustrative example of a water vapor generation system, which may be used in a greenhouse insulation system, in accordance with at least one embodiment.

FIG. 4 shows an illustrative example of a water vapor generation system 400, which may include one or more aspects of systems 128, 130 of the system 100 described above in reference to FIG. 1. FIG. 4 gives an example of the components of a system to produce a treated (e.g., temperature, gaseous components, and/or humidity) gas that can be moved or removed from an open cavity or conduit, such as illustrated in FIG. 1, making up the roof and/or walls of a structure. The water vapor generation system 400 may include an ultrasonic diffuser 404, such as with multiple discs, and a reservoir 418 holding hot water, cold water, or some other fluid, which may be temperature treated (e.g., heated or cooled) by a heating system 402 and/or cooling system 406. In some cases, the ultrasonic diffuser 404 may vaporize the liquid held in tank 418 to produce a gaseous substance (e.g., water vapor) that may fill the remaining space 420 in the reservoir, where negative air pressure may be employed to move the gas into open cavities or conduits, such as illustrated in FIG. 1, through delivery conduit or channel 422. A vapor transmission system consisting of louvers, dampers, and/or valves 424 may be implemented to control the flow of vapor through delivery channel 422 moving into open cavities. A centrifugal and/or axial fan 408 may be utilized to pull air or gas through a filter 410 and then push the air into reservoir 418 creating negative pressure to move vapor out of the reservoir 418 into the open cavities through channel(s) 422. System 400 may also include water management components, such as a water pump 414, which keeps the aqueous solution in the reservoir 418 moving and delivers fresh water (or other liquid) to the reservoir 418 through a filtration system 412, which may demineralize incoming water or liquid. System 400 may also include one or more peristaltic pumps 416, which may be used to introduce hydrogen peroxide, acid, base, and or growth inhibitors into the solution to be diffused into the conduits through delivery channel(s) 422.

Figure 5:
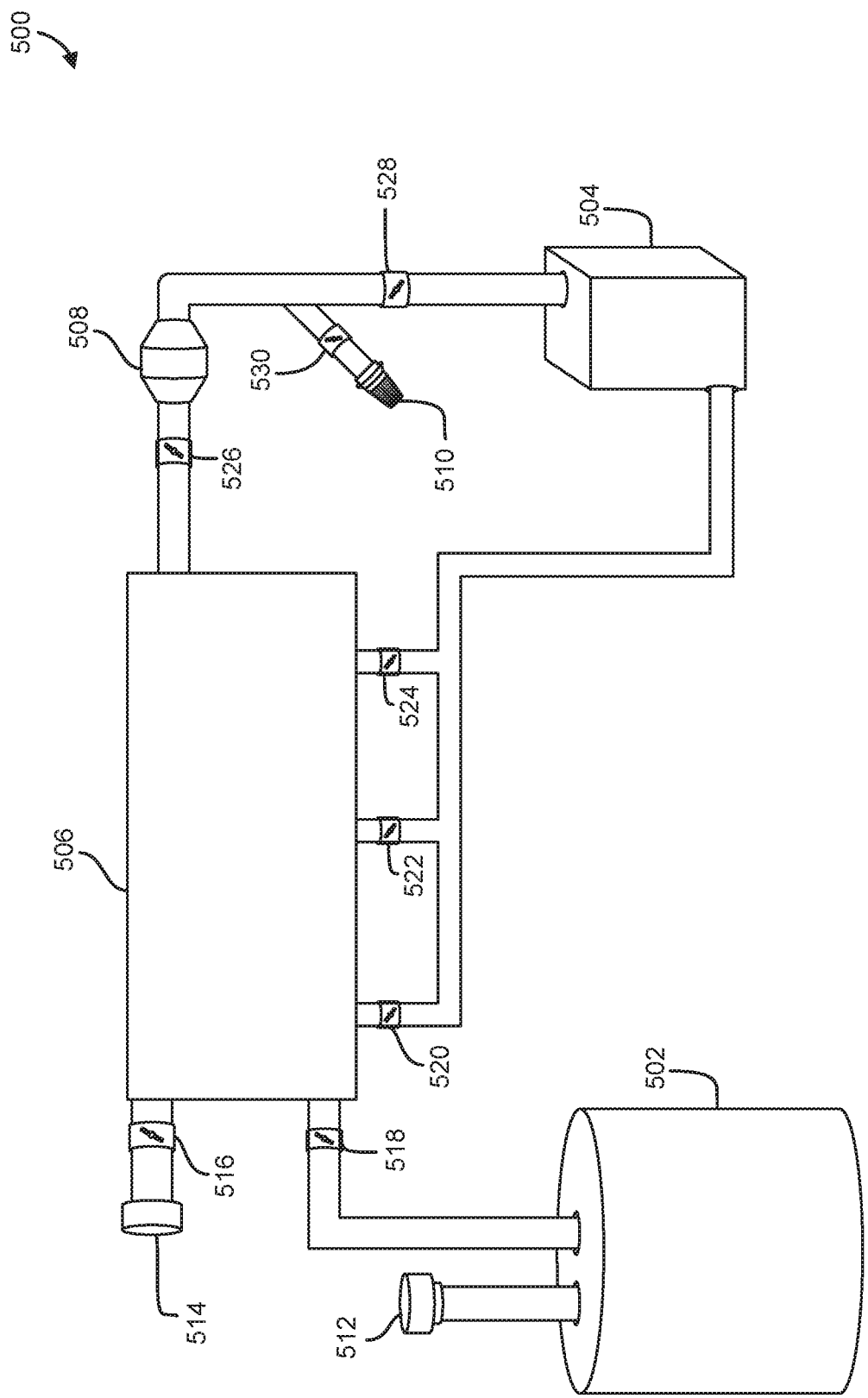
FIG. 5 shows an illustrative example of a water vapor generation and extraction system, which may be used in a greenhouse insulation system, in accordance with at least one embodiment.

FIG. 5 shows an illustrative example of a water vapor generation and extraction 500, which may be part of the system 100 described above in reference to FIG. 1. System 500 may perform a dehumidification process to manipulate the gas used on the conduits or cavities of FIG. 1 to provide changes in shading and insulation properties of surfaces of a structure enclosing a growing or other space. System 500 may allow for rapid removal of gas or vapor within open cavities. In some aspects, system 500 may incorporate one or more aspects of system 400, with the addition of a dehumidifier or filter sub-system 504 that may further condition or alter properties of a gas that is used to change the insulation and/or sun protection of one or more structures. System 500 may include a gas supply system or vapor generation system 502, a primary conduit 506 which may be filled with the gas to change insulation and/or sun protection properties of the conduit, and a dehumidification or air conditioning system 504, communicatively coupled by partially or fully enclosed transport channels. System 500 may also include a number of dampers, louvers, relief valves, and/or flow valves 516-530 that may control the flow of gas in order to minipulate the direction and flow of gas through a partially or fully enclosed conduit system.

In some cases, system 500 may also include one or more axial or centrifugal fans 508, 512, 514 that may help enable flow of the gas through the conduit system of system 500. These fans may provide flow to move vapor or gas out of cavities, such as described above in reference to FIG. 1 through control points such as dampers, louvers, and/or valves 516-530, and through tubes or channels and into a dehumidification system 504. In some cases, the gas or vapor may be directed through a dehumidification system 504 and an axial and/or centrifugal fan 508. The dehumidified or conditioned gas may then be directed back into open cavities through control points of louvers, dampers, and/or valves. These components may be used as a system to rapidly remove vapor and dehumidify cavities, as illustrated and described in reference to FIGS. 1 and 4 above. In some cases, one or more air filters 510 may be provided to remove particulates and other unwanted substances from ambient air or other gas source, before entering the conduit system of system 500.

In some aspects, in any of the described examples herein, the dehumidification process, or extraction of a treated gas from the insulating and sun protection cavity may be additionally or alternatively accomplished by forcing another gas through the cavity to purge the cavity of the treated gas. In some cases, a dehumidified gas may be used, such a dehumidified air (e.g., below a certain water content). In other cases, an inert gas may be used, such as argon, or a gas with some type of anti-microbial agent to remove unwanted contaminates from the cavity It should be appreciated that the number, arrangement, dimensions, and relative physical locations of certain components of system 500, such as valves 518-530, fans 508, 512, 514 and sub-systems 502, 506, 508 are only given by way of illustrative example. Other configurations, including different numbers of certain components, modifications of certain subsystems 502, 504, 506, etc. are contemplated herein.

Figure 6:
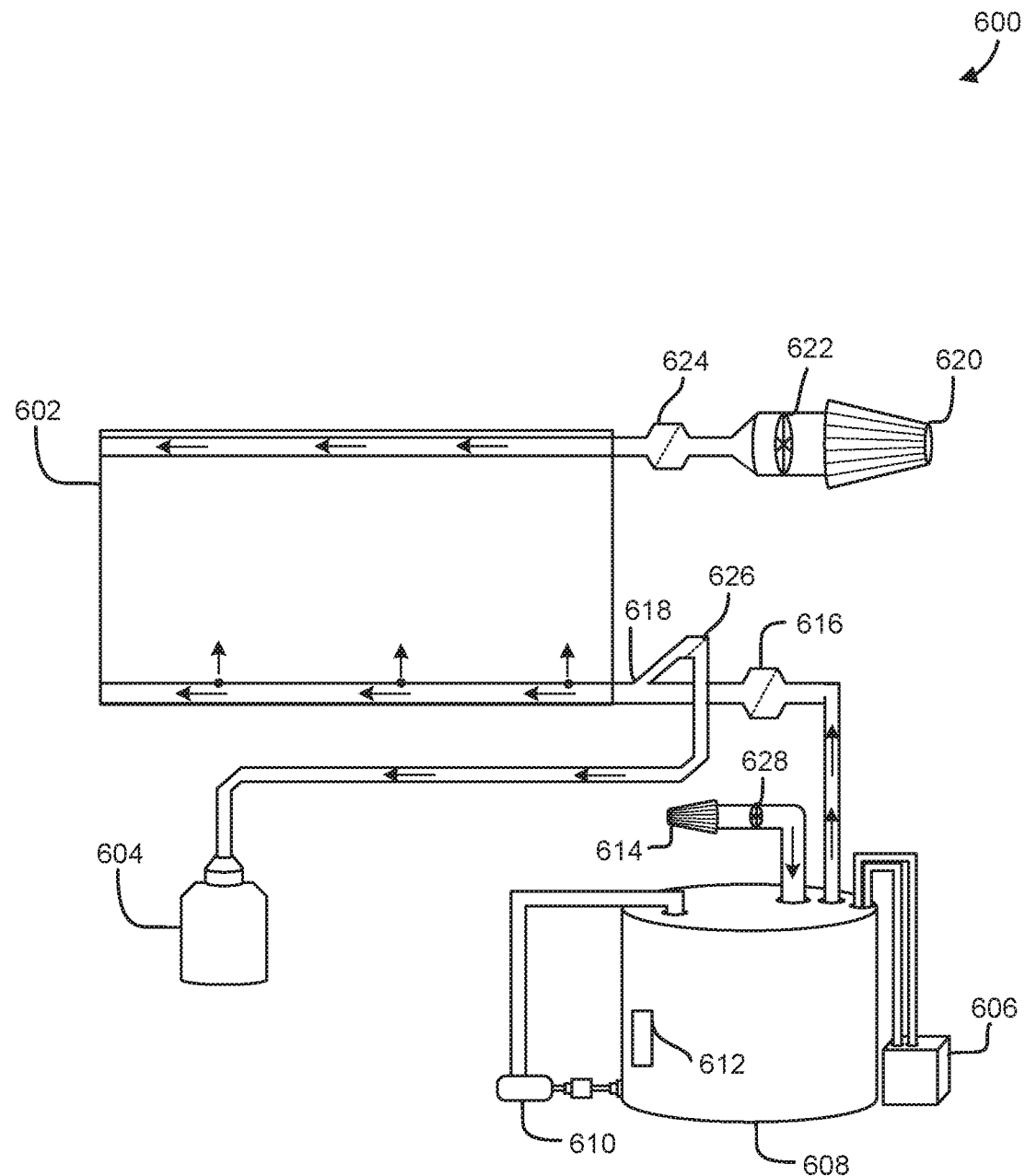
FIG. 6 shows an illustrative example of a water vapor generation and extraction system, which may be used in a greenhouse insulation system, in accordance with at least one embodiment.

FIG. 6 shows another illustrative example of a gas or water vapor generation and extraction system 600, which may be part of the system 100 described above in reference to FIG. 1. System 600 may include aspects of systems 100, 200, 300, 400, and/or 500 described above in reference to FIGS. 1, 2, 3, 4, and 5. System 600 includes a different application or system to dehumidify cavities. The illustrated variation uses centrifugal and/or axial fans 622, 628 to rapidly force filtered air or gas into cavities. This process works together with a wetvac system, which may include a blower/centrifugal fan 622 that may be used to push air (indicated via arrows) to evacuation tank or reservoir 604 with the use of one or more values, such as one-way valves 624, 626 that may be opened when other values 616 are closed, to enable the blower 622 to direct the gas in the chamber of channel 602 to reservoir 604. In normal operation, valves 624, 626 may be closed, and valve 616 may be opened to allow gas, which may conditioned in one or more ways including temperature, humidity, demineralization, to flow (indicated via arrows) into chamber 602 to provide desired insulating and sun protection properties. In some aspects, the centrifugal and/or axial fans push gas or vapor out of cavities as the wetvac will draw vapor out of cavities and collect moisture.

In some aspects, proximate to valve 626, a y or other fitting 618, such as formed at 2% grade, may disposed in the evacuation channel to help facilitate vacuuming and moisture extraction of void between double layer structure.

In some cases a cooling system 606 and/or a heating system 612 may provide temperature conditioning of a liquid to be introduced into the gas held in reservoir 608. In other cases, cooling system 606 and/or heating system 612 may directly condition the gas to be introduced into chamber 602. Similarly, a demineralization system or device 610 may be communicatively coupled to reservoir 608 to remove unwanted substances from the gas (e.g., demineralize) contained in reservoir 608. As described in reference to FIGS. 4 and 5, various other components, such as air filters 614, 620, various other valves, etc. may also be sued in system 600 to a similar effect.

Figure 7:
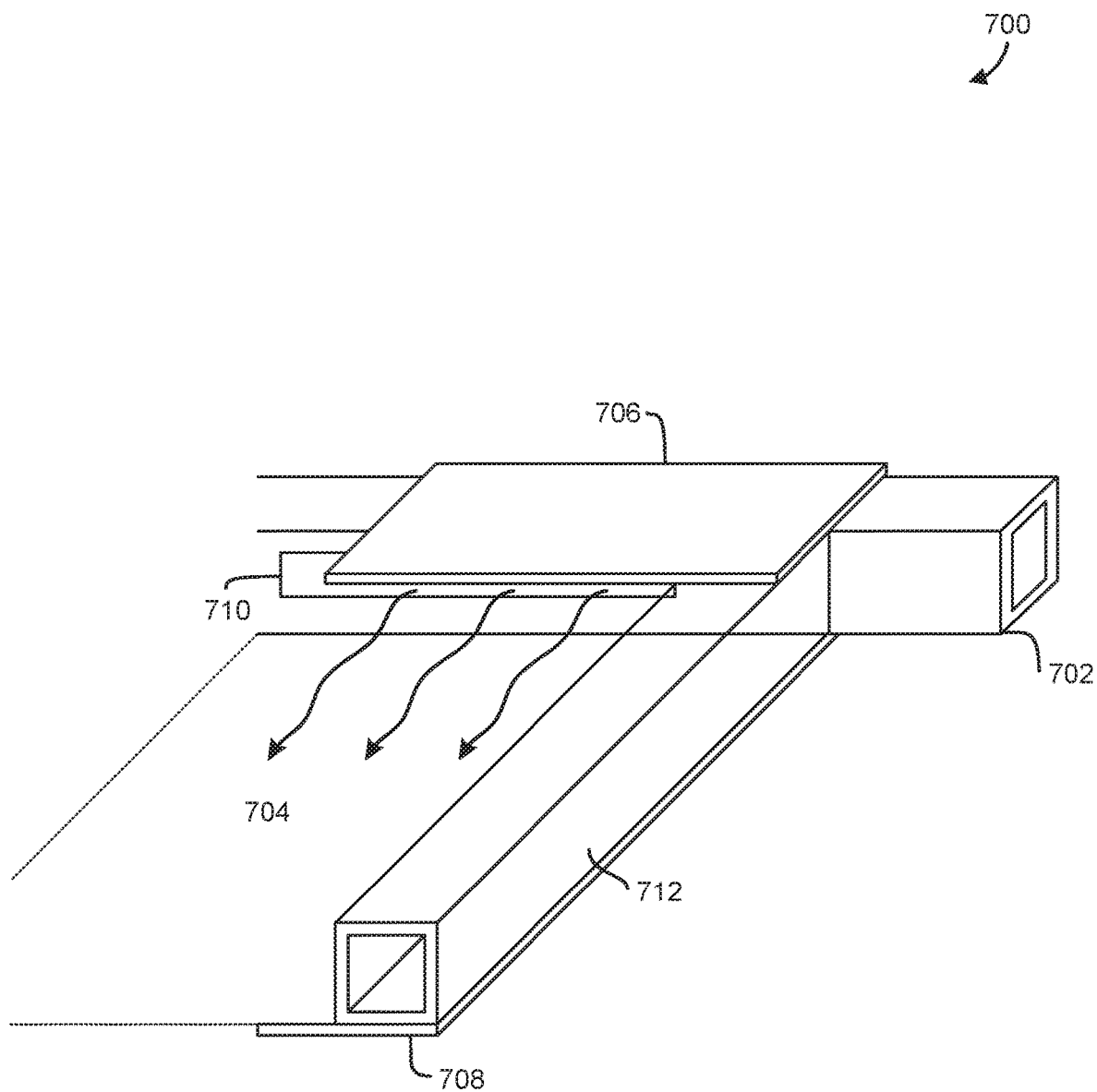
FIG. 7 shows another illustrative example of a water vapor conduit, which may be used in a greenhouse insulation system, in accordance with at least one embodiment.
Figure 8:
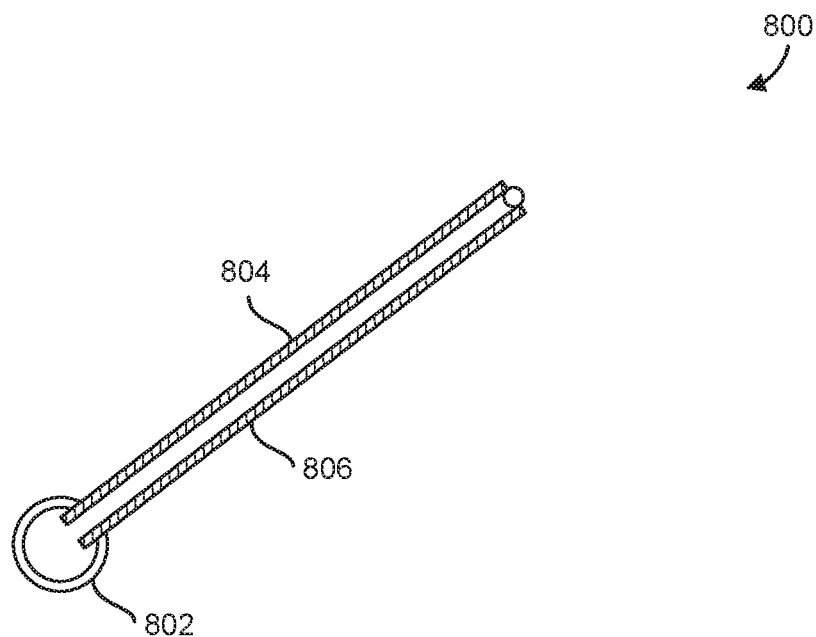
FIGS. 8-11 show different views of example water vapor conduits, which may be used in a greenhouse insulation system, in accordance with at least one embodiment.
Figure 9:
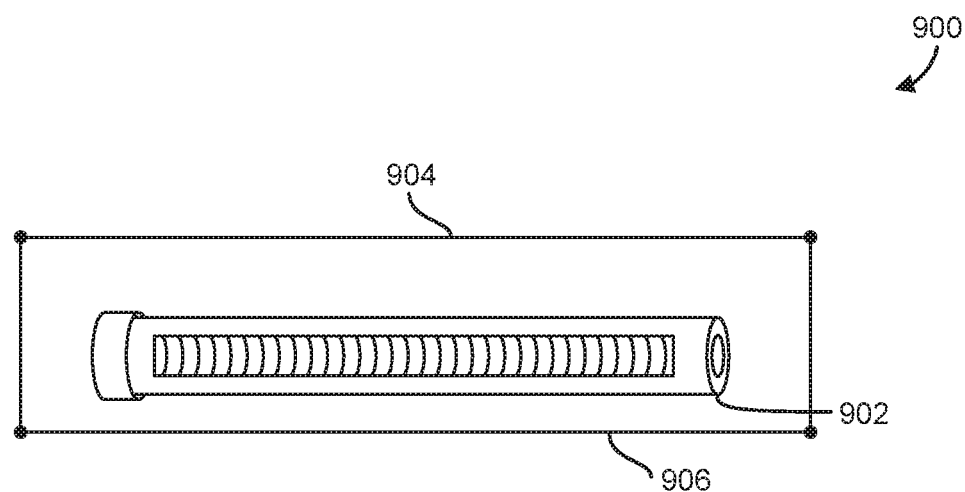
Figure 10:
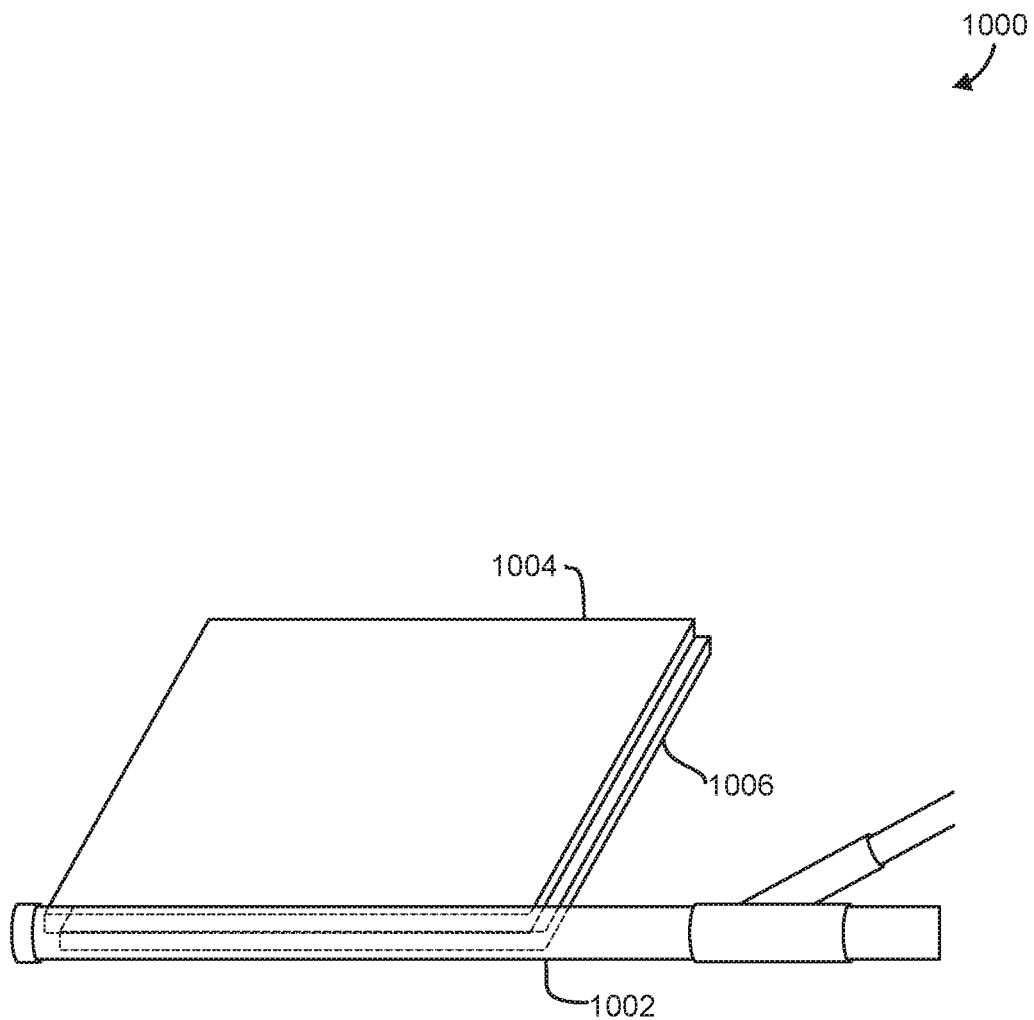
Figure 11:
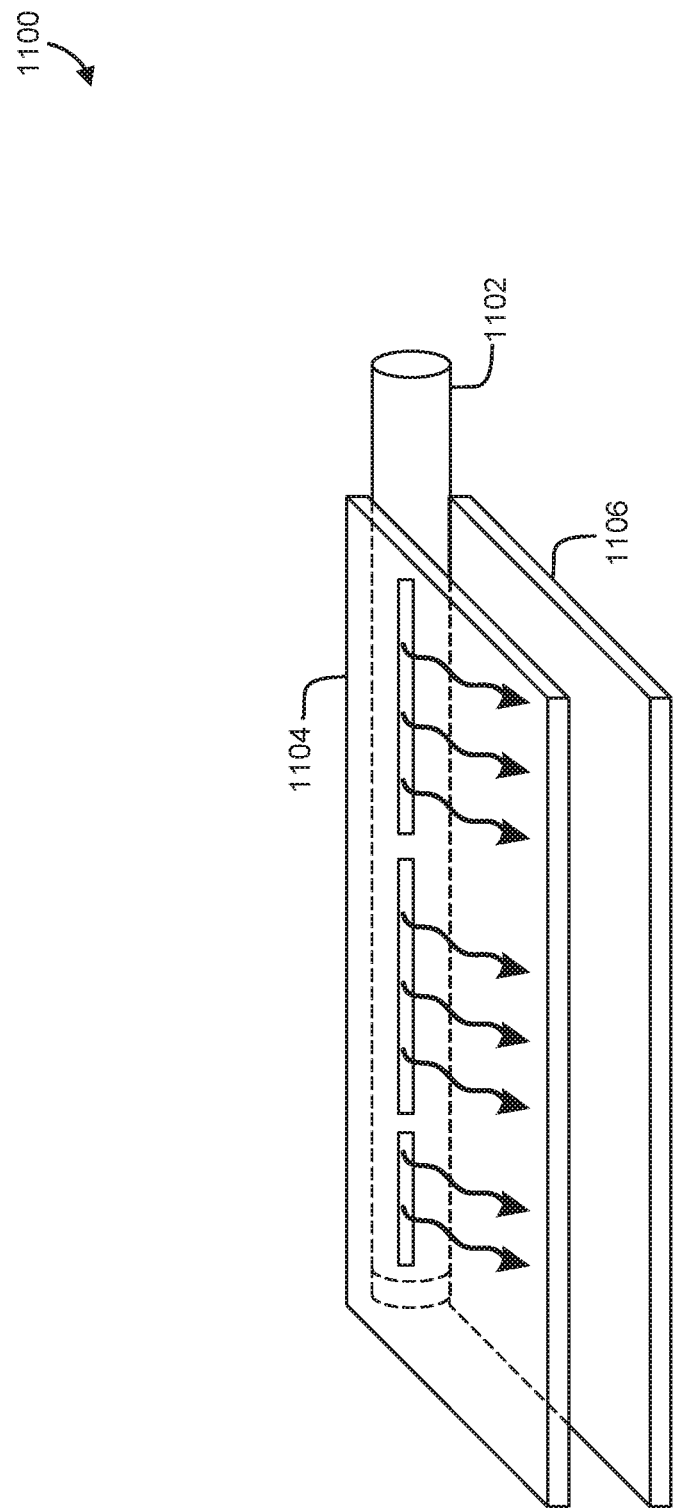

FIG. 7 shows an illustrative example of a water vapor conduit 700, which may be used as part of systems 100, 200, 300, 400, 500, and/or 600 described in reference to FIGS. 1-6. In some aspects, conduit 700 may include a square or round or partially round tube 702 for delivering water vapor or other gas to a cavity 704 formed by two at least partially transparent surfaces or sheets 706, 708. In some cases, the tube portion 702 may include a number of openings 710 for diffusing the water vapor into the cavity 704 in a more uniform way. In some aspects, the cavity 704 and/or tube portion 702 may be any number of shapes, and may be made of a variety of materials including polycarbonate, plastic, glass, or other substances.

In some aspects, the deliver tube or channel 702 may be disposed along one dimension of a cavity 704 in which a treated gas is to be introduced. In other cases, one or more other channels 712 may also be proved proximate to the cavity to change or modify the characteristics (e.g., speed, uniformity, etc.) of the gas into the cavity 704. In some aspects valves or other similar structures may further be utilized to enable switching which delivery tubes 702, 710 are active at one time, so as to enable more configuration of different types, speed, etc., of deliver of one or more treated gases into cavity 704. In some cases, two different treated gasses may be introduced into the cavity at the same time or in temporal proximity to alone another.

In some aspects cavity may be fully enclosed, such that the only opening to anything outside of the cavity is through openings 710 in one or more delivery tubes or channels 702, 712. In other cases, cavity may include one or more additional openings, such that can controllable be opened and closed. These additional openings may be disposed on a surface of structural element 708, such as that may face an internal space to be insulated. In some cases, when the described systems are used for a greenhouse or other growing type structure, the additional openings may be positioned so that the gas may exit towards the growing space, such as to provide humidity to the growing space when less insulation is desired, and thus the cavity 704 is evacuated of humidified gas.

FIGS. 8-11 show different views of an example water vapor conduit, such as conduit 700 described above in reference to FIG. 7, which may be used as part of systems 100, 200, 300 400, 500, and/or 600 described in reference to FIGS. 1-6 above. In some aspects, the tube portion 802, 902, 1002, 1102 and layers forming the cavity 804, 806, 904, 906, 1004, 1006, 1104, 1106 may be separate pieces, such as in devices 900, 1000, or 1100, or may be formed together, such as in device 800. In some cases, the cavity pieces may be removabley attached to the tube portion, to enable adaption of the system to different shapes, sizes, structures, etc.

Figure 12:
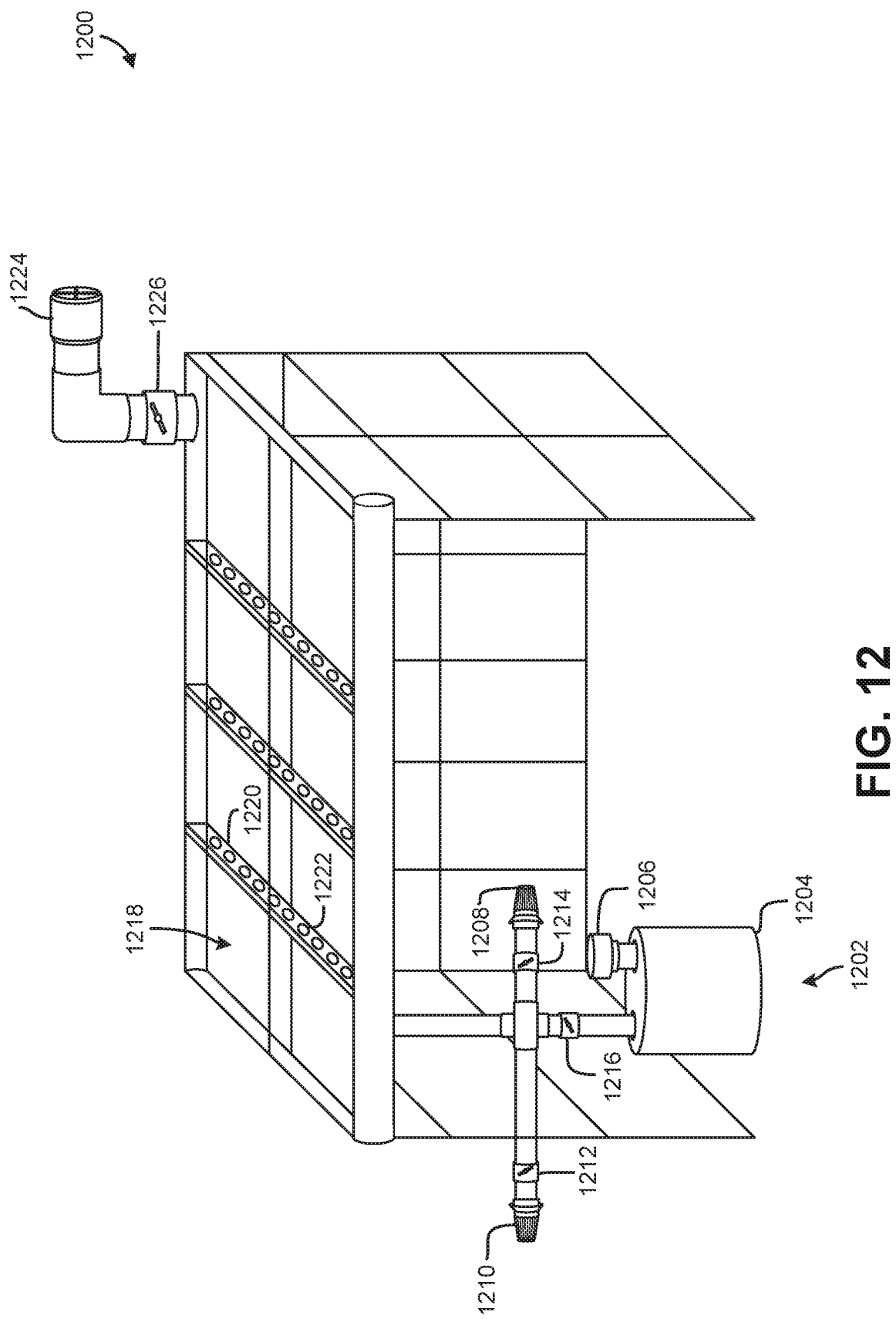
FIG. 12 shows another illustrative example of a greenhouse insulation system, in accordance with at least one embodiment.

FIG. 12 shows another illustrative example of a greenhouse insulation system 1200. In some aspects, greenhouse insulation system 1200 may include a water vapor or gas generation and/or extraction system 1202, which may incorporate one or more aspects of water vapor or gas generation and/or extraction systems 400, 500, and/or 600 described above in reference to FIGS. 4, 5, and/or 6. In some aspects, system 1200 may also utilize one or more conduit structures, such as conduits 700, 800, 900, 1000, and or 1100, as described above in reference to FIGS. 7, 8, 9, 10, and 11.

In the example illustrated, gas generation and/or extraction system 1202 may include a gas preparation or conditionings system/reservoir 1204, which as described above may include a fan or air movement device or system 1206 for intaking air or other gas into the a reservoir 1206, air filters or fans 1208, 1210, 1224 coupled with valves 1212, 1214, 1226 also for intaking air or other gas, and a valve 1216 for controlling flow into a cavity 1218 to be filled with a treated gas. In the example of system 1200, the treated gas may be delivered to the cavity 1218, which may contain a number of dividers or partitions 1220, with one or more openings 1222 in one or more of the partitions, to change the movement of the treated gas in the cavity 1208. In some cases, the number, shape and position of the partitions, and/or the shape, number of openings, and the spacing of the openings along each partition may be selected to produce a desired flow of a treated gas throughout cavity 1208. In some cases, the partitions and openenings may be configured to reduce movement of the treated gas through the cavity 1218, and/or to ensure or promote a more uniform disbursement of the treated gas throughout cavity, such as by placing the partitions in a certain physical relation to one or more openings that supply the treated gas to cavity 1218.

Figure 13:
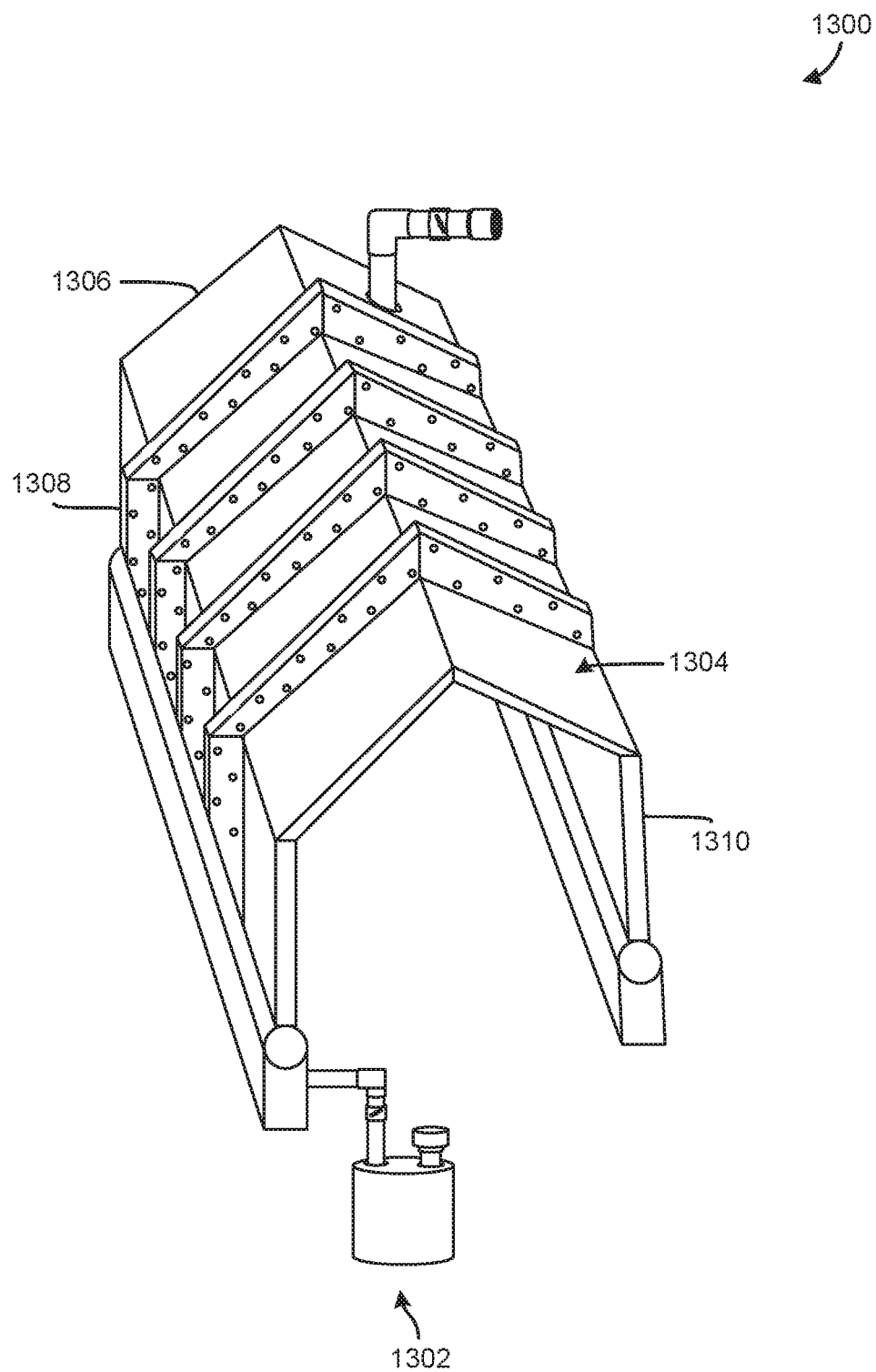
FIG. 13 shows another illustrative example of a greenhouse insulation system, in accordance with at least one embodiment.

FIG. 13 another illustrative example of a greenhouse insulation system 1500. In some aspects, greenhouse insulation system 1500 may include a water vapor or gas generation and/or extraction system 1502, which may incorporate one or more aspects of water vapor or gas generation and/or extraction systems 400, 500, and/or 600 described above in reference to FIGS. 4, 5, and/or 6. In some aspects, system 1500 may also utilize one or more conduit structures, such as conduits 700, 800, 900, 1000, and or 1100, as described above in reference to FIGS. 7, 8, 9, 10, and 11. In some aspects, system 15400 may include one or more aspects of system, 1200 described above, and for the sake of brevity, those similar aspects will not be described again here.

In example system 1300, a gas (e.g., water vapor) generation and/or extraction system 1302 may deliver treated gas to one or more cavities 1304 (illustrated with a top or cap of the roof and exterior surface of walls missing for explanatory purposes) which may define at least a portion of the roof 1306 and one or more walls 1308, 1310 of a growing or greenhouse structure. The one or more cavities 1304 may include one or more partitions 1312, 1314, 1316, 1318, each with one or more openings 1320 that may be designed to control the flow of one or more treated gases within the cavity 1304. As illustrated a single cavity 1304 may be defined across the roof structure 1306 and one or more of wall structures 1308, 1310, with each partition 1312, 1314, 1316, 1318 spanning a cross section of the cavity 1304. In some aspects, the partitions 1312, 1314, 1316, 1318 may be made of an at least partially transparent material, such as plastic, glass, polycarbonate sheets, etc., and may be rigid to form part of the roof structure, or may be at least partially flexible in the case that the partitions 1312, 1314, 1316, 1318 are not forming a supporting component of the roof 1306.

It should be appreciated that in any of the above examples of systems 1200 or 1300, the partitions may take any of a variety of shapes, sizes, forming different cross sections, occupying a whole or part of a cavities, etc., while providing the functionality of modifying the flow of a treated gas through one or more cavities of an insulation system and/or building structure.

Figure 14:
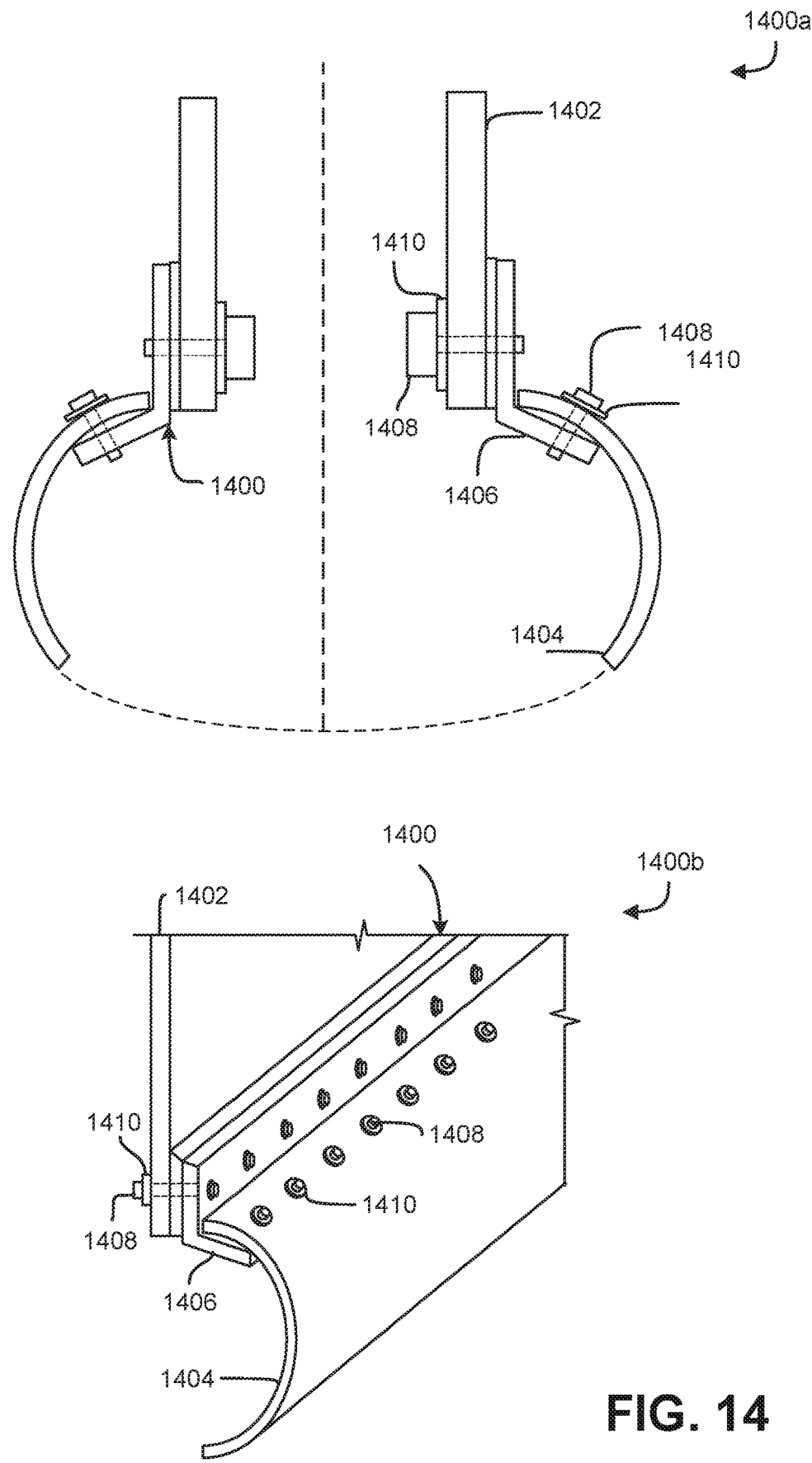
FIG. 14 shows an illustrative example of an assembly between a conduit and a transparent surface, which may be used in a greenhouse insulation system, in accordance with at least one embodiment.

FIG. 14 shows different views 1400*a* and 1400*b* of an example an assembly 1400 between a conduit and a transparent surface, which may be used in a greenhouse insulation system, such as any of the system described above. Assembly 1400 may be an example of a junction between one or more surfaces that form a cavity in which treated gas may be injected and/or evacuated, and a delivery channel that is used to transport the treated gas or water vapor to the cavity, such as from a gas generation and/or evacuation system, as also described above.

Assembly 1400 may any of a variety of fasteners to couple a transparent, planar or other structure 1402 to a duct or gas transportation channel 1404 (shown cut away across axis 1420, but would extend to form a circle or oval to connect to a similar structure across axis 1420, slightly less than 360 degrees to accommodate a similar transparent or partially transparent structure disposed in parallel to structure 1402). It should be appreciated that assembly 1400 is only given by way of example, and that various other fasteners or fasting systems or techniques may be utilized to a similar effect. In the illustrated example, transparent structure 1402 may be fastened or secured to duct 1404 via an angled bracket 1406 that is coupled to each of the duct 1404 and transparent structure 1402 via fasteners 1408 and washers 1410, so as to from an airtight seal (or partially airtight seal) between the transparent structure 1402 and duct 1404. This similar structure may be duplicated on the side opposite of the duct 1404 so as form an enclosed space including the interior of the duct 1402 and a space between two planar or parallel transparent structure's 1402.

In some aspects, the described system and techniques may include one or more of the following features.

System that manipulates gas produced by an ultrasonic diffuser consisting of multiple diffuser discs to produce a gas or water vapor having a micron measurement of 5 or less.

System utilizing y fitting at 2% grade for vacuuming and moisture extraction of void between double layer structure.

Intake system for open cavity utilizing automatic air dampers in order to control flow of gas during gas injection or filling operations and moisture extraction operations.

System utilizing a water chiller to cool water used by ultrasonic diffusers in order to create a cooled gas, for the purpose of greenhouse cooling.

System utilizing a water heater to heat water used by ultrasonic diffusers in order to create a warmed or heated water vapor or gas for the purpose of greenhouse heating.

System utilizing dye within water used by ultrasonic diffusers to create a darkened colored fog, for the purpose of greenhouse shading.

System using hydrogen peroxide within water used by ultrasonic diffusers to treat water and prevent the growth of algae and other undesirable growth.

System utilizing a water demineralization process for water used by ultrasonic diffusers in order to prevent mineral buildup with system.

System utilizing cylindrical tubing to irrigate water vapor to system's open cavity.

System utilizing cylindrical tubing to enable moisture to drain back to reservoir.

System utilizing transparent/clear supports layers to maintain an open cavity between the clear layers.

System utilizing tubing with holes and or slots in order to create a passageway for a rapid moving air for the purpose of dehumidification within open cavity of double layer structure.

System utilizing vapor/gas moving between two layers to increase installation value of a structure.

System utilizing cooled vapor/gas moving between two layers to cool structure.

System utilizing warmed vapor/gas moving between two layers to heat structure.

A method of changing insulation of an at least partially transparent structure, the method including treating a gas by at least one of heating, cooling, or introducing a an aqueous substance into the gas to generate a treated gas; providing the gas to an at least partially transparent conduit system to increase an insulation characteristic of the structure, wherein the at least partially transparent conduit system forming part of a component of the at least partially transparent structure; and evacuating the gas from the at least partially transparent conduit system to at least one of increase ultra violet radiation through the at least partially transparent conduit system or decrease the insulation characteristic of the structure. In some cases, the method may further include treating the gas by heating water or an aqueous solution proximate to the gas to generate water or other type of vapor. In some cases, the method may further include evacuating the gas from the at least partially transparent conduit system by injecting at least one of a dehumidified gas or an inert gas into the at least partially transparent conduit system.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. An insulation system, comprising:
   a water vapor generation system comprising a water cooling element, and at least one of a water heating element or a water diffusing element, wherein the water vapor generation system conditions water vapor through at least one of heating, cooling, or diffusing water;
   a water vapor movement system in communication with the water vapor generation system; and
   a water vapor conduit system in communication with the water vapor movement system, wherein the water vapor movement system causes the water vapor to be injected into the water vapor conduit system to change insulation characteristics of a space in proximity to the water vapor conduit system, and wherein the water vapor conduit system comprises an at least partially transparent material.

2. The system of claim 1, wherein the water vapor movement system further causes the water vapor to be removed from the water vapor conduit system to change insulation characteristics of the space in proximity to the water vapor conduit system.

3. The system of claim 2, wherein the water vapor movement system comprises at least two of a fan element, a vacuum element, and a valve element.

4. The system of claim 2, wherein the water vapor movement system comprises one of a dehumidifier or a wet vacuum.

5. The system of claim 2, wherein the water vapor movement system causes the water vapor to be injected or removed from the water vapor conduit system to change sun exposure to the space in proximity to the water vapor conduit system.

6. The system of claim 2, wherein the water vapor movement system causes the water vapor to be removed from the water vapor conduit system by injecting at least one of dehumidified air or an inert gas into the water vapor conduit system.

7. The system of claim 1, wherein the water vapor conduit system comprises at least one tube portion in communication with a cavity formed by two planar transparent members.

8. The system of claim 1, wherein the water vapor conduit system forms part of at least one of a roof or a wall of a greenhouse structure.

9. An insulation system, comprising:
   a gas treatment system comprising at least one of a heating element, a cooling element, and a diffusing element that operate on a liquid to condition the liquid and combine it with a gas to form a treated gas;
   a gas movement system in communication with the gas treatment system; and
   a gas conduit system in communication with gas movement system, wherein the gas movement system causes treated gas generated by the gas treatment system to be injected into the gas conduit system to change insulation characteristics of a space in proximity to the gas conduit system.

10. The system of claim 9, wherein the gas movement system further causes treated gas to be removed from the gas conduit system to change insulation characteristics of the space in proximity to the gas conduit system.

11. The system of claim 9, wherein the gas movement system comprises a fan element and a vacuum element.

12. The system of claim 9, wherein the gas movement system comprises a dehumidifier.

13. The system of claim 9, wherein the gas movement system causes the treated gas to be injected or removed from the gas conduit system to change sun exposure to the space in proximity to the gas conduit system.

14. The system of claim 9, wherein the gas movement system causes the treated gas to be removed from the water vapor conduit system by injecting at least one of dehumidified air or an inert gas into the gas conduit system.

15. The system of claim 1, wherein the gas conduit system comprises at least one tube portion in communication with a cavity formed by two planar transparent members.

16. The system of claim 8, wherein the water vapor conduit system forms part of at least one of a roof or a wall of a partially enclosed biomaterial growing structure.

17. The system of claim 8, wherein the gas conduit system comprises an opaque material.

* * * * *